(12) United States Patent
Konishi

(10) Patent No.: US 10,515,291 B2
(45) Date of Patent: Dec. 24, 2019

(54) TEMPLATE CREATION DEVICE AND TEMPLATE CREATION METHOD

(71) Applicant: OMRON Corporation, Kyoto-shi, Kyoto (JP)

(72) Inventor: Yoshinori Konishi, Souraku-gun (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/712,826

(22) Filed: Sep. 22, 2017

(65) Prior Publication Data

US 2018/0025252 A1 Jan. 25, 2018

Related U.S. Application Data

(63) Continuation of application No. PCT/JP2016/062799, filed on Apr. 22, 2016.

(30) Foreign Application Priority Data

Apr. 28, 2015 (JP) .................. 2015-091639

(51) Int. Cl.
*G06K 9/62* (2006.01)
*G06K 9/46* (2006.01)

(52) U.S. Cl.
CPC ......... *G06K 9/6202* (2013.01); *G06K 9/4609* (2013.01); *G06K 9/4671* (2013.01)

(58) Field of Classification Search
None
See application file for complete search history.

(56) References Cited

U.S. PATENT DOCUMENTS

| 7,400,760 B2* | 7/2008 | Takizawa | G06K 9/6203 382/153 |
| 9,036,898 B1* | 5/2015 | Beeler | G06T 19/20 382/154 |
| 2003/0086616 A1* | 5/2003 | Oh | G03F 9/7076 382/209 |

(Continued)

FOREIGN PATENT DOCUMENTS

| EP | 2048599 A1 | 4/2009 |
| JP | 2005-078445 A | 3/2005 |

(Continued)

OTHER PUBLICATIONS

Tsarouchi et al, A method for detection of randomly placed objects for robotic handling, CIRP Journal of Manufacturing Science and Technology 14 (2016) 20-27. (Year: 2016).*

(Continued)

*Primary Examiner* — Andrae S Allison
(74) *Attorney, Agent, or Firm* — Metrolex IP Law Group, PLLC

(57) ABSTRACT

A template creation device may include an acquisition unit configured to acquire a plurality of templates from a plurality of images of different poses of a single object, or a plurality of images for a plurality of objects. The template creation device may further include a clustering unit configured to divide the plurality of templates into a plurality of groups on the basis of a similarity score; and an integration unit configured to combine the templates in a group into an integrated template. A new template set may be created from the plurality of integrated templates corresponding to each group in the plurality of groups.

20 Claims, 12 Drawing Sheets

(56) References Cited

U.S. PATENT DOCUMENTS

| | | | | |
|---|---|---|---|---|
| 2007/0022065 | A1* | 1/2007 | Hatano | G06K 9/6219 706/16 |
| 2007/0239745 | A1* | 10/2007 | Guerraz | G06F 17/30705 |
| 2011/0029469 | A1* | 2/2011 | Yamada | G06F 17/18 706/14 |
| 2013/0166061 | A1* | 6/2013 | Yamamoto | B25J 9/1664 700/214 |
| 2014/0355886 | A1* | 12/2014 | Konishi | G06K 9/4609 382/195 |
| 2017/0024869 | A1* | 1/2017 | Konishi | G06T 7/001 |
| 2017/0221274 | A1* | 8/2017 | Chen | G06T 15/005 |
| 2018/0204090 | A1* | 7/2018 | Konishi | G06T 1/20 |
| 2018/0260661 | A1* | 9/2018 | Konishi | G06K 9/6255 |
| 2018/0260669 | A1* | 9/2018 | Konishi | G06K 9/4671 |

FOREIGN PATENT DOCUMENTS

| | | | |
|---|---|---|---|
| JP | 2011-013818 | * | 1/2011 |
| JP | 2011-13818 A | | 1/2011 |
| JP | 2012-022622 A | | 2/2012 |
| JP | 2014-29664 A | | 2/2014 |

OTHER PUBLICATIONS

Tsarouchia et al, Vision System for Robotic Handling of Randomly Placed Objects,2nd CIRP Global Web Conference, Procedia CIRP 9 ( 2013) 61-66 (Year: 2013).*

Gupta, Nikhil, et al. "Object recognition using template matching." Available in: https://tmatch. googlecode. corm/svnhistory/r38/trunk/report/report. pdf (2008). (Year: 2008).*

Ryu, Choonwoo, Youngchan Han, and Hakil Kim. "Super-template generation using successive bayesian estimation for fingerprint enrollment." International Conference on Audio-and Video-Based Biometric Person Authentication. Springer, Berlin, Heidelberg, 2005. (Year: 2005).*

English translation of the International Search Report of PCT/JP2016/062799 dated Jul. 5, 2016.

English translation of Written Opinion of PCT/JP2016/062799 dated Jul. 5, 2016 from the International Searching Authority.

Luke Cole et al, "Visual Object Recognition using Template Matching", Proceedings of Australian Conference on Robotics and Automation, May 1, 2004, pp. 1-9.

James L Crowley et al, "Multiple Resolution Representation and Probabilistic Matching of 2-D Gray-Scale Shape", IEEE Transactions on Pattern Analysis and Machine Intelligence, Jan. 1, 1987, pp. 113-121, vol. 30, No. 1, IEEE Computer Society, USA.

George Stockman et al,"3D object pose from clustering with multiple views", Pattern Recognition Letters, Jul. 1, 1985, pp. 279-286, vol. 3, No. 4, Elsevier, Amsterdam, NL.

Katsushi Ikeuchi et al, "Model-based SAR ATR system", Proceedings of SPIE, Algorithms for Synthetic Aperture Radar Imagery III, pp. 376-387, vol. 2757, Jun. 10, 1996, Bellingham, WA, USA.

The Extended European search report (EESR) dated Oct. 5, 2018 in a counterpart European patent application.

An Office action dated Dec. 4, 2018, in a counterpart Japanese patent application.

* cited by examiner

TEMPLATE CREATION DEVICE AND TEMPLATE CREATION METHOD

CROSS REFERENCE TO RELATED APPLICATIONS

This application is a continuation application of International Application No. PCT/JP2016/062799, filed on Apr. 22, 2016, which claims priority based on the Article 8 of Patent Cooperation Treaty from prior Japanese Patent Application No. 2015-091639, filed on Apr. 28, 2015, the entire contents of which are incorporated herein by reference.

FIELD

The present disclosure relates to techniques for creating templates used in object recognition carried out via template matching.

BACKGROUND

Template-matching based object recognition may be employed for many purposes, such as inspection or picking in factory automation (FA), robot vision, security cameras, and the like. The basic processing in template matching involves preliminarily registering a model of the object for recognition (i.e., a template), and evaluating the degree of similarity between the image features in an input image and the model to thereby detect the 2D position or 2D pose of an object included in the input image.

Recently, there has been increasing focus on applying image template matching techniques to recognizing the position or the pose of an object in three dimensions. Template matching may use an existing imaging device without needing a high-quality distance sensor and is thus less costly. However, attempting to recognize an object in any pose through image template matching requires preparing individual templates for each pose to be recognized and iterating through the templates to find a match, so this technique is quite costly in terms of the processing time.

Patent Document 1 discloses a means for countering this problem. More specifically, the views (viewpoints) that appear similar based on the similarity scores for a 2D image projection are grouped to reduce the number of templates. The process is repeated for the reduced number of templates while decreasing the resolutions thereof to create multi-layered templates. However, it is likely that the number of templates cannot be suitably reduced depending on the shape of the recognition object since the technique in Patent Document 1 reduces the number of viewpoints. For instance, symmetrical or simply shaped objects appear similar even when the viewpoints are actually distant. However, the technique in Patent Document 1 is limited because the technique cannot group distant viewpoints; consequently, the technique cannot sufficiently reduce the number of times template matching is performed or reduce the processing time.

REFERENCES

Patent Documents

Patent Document 1: European Patent Specification Number 2048599

SUMMARY

Technical Problem

In light of the foregoing, one or more embodiments effectively reduce the number of templates and effectively combine the templates used for recognizing an object.

Solution to Problem

To address the foregoing problems one or more embodiments provide for a template creation device configured to create a set of templates used in an object recognition device configured to recognize objects using template matching; the template creation device including: an acquisition unit configured to acquire a plurality of templates from a plurality of images of different poses of a single object, or a plurality of images for a plurality of objects; a clustering unit configured to carry out a clustering process which computes a similarity score for an image feature for a combination of two templates selected from the plurality of templates and divides the plurality of templates into a plurality of groups on the basis of the similarity score; and an integration unit configured to carry out an integration process which, for each of the plurality of groups, combines all the templates in a group into a single integrated template or a number of integrated templates less than the number of templates within the group, and to create a new template set from the plurality of integrated templates corresponding to each group in the plurality of groups.

This configuration combines templates with similar image features (regardless of the distance of the viewpoint); therefore, better results can be expected when reducing the templates, and the templates more effectively combined compared to conventional approaches which reduce the number of viewpoints. The effects are greatly improved particularly when the recognition object is symmetrical or simply shaped.

The template creation device may further include a resolution modification unit configured to create a plurality of low-resolution templates by lowering the resolution of each of the integrated templates from the plurality of integrated templates obtained during the integration process from the integration process; and the clustering unit may perform the clustering process and the integration unit may perform the integration process on the plurality of low-resolution templates obtained during the resolution modification process to thereby create a new low resolution template set. Because lowering the resolution of the template makes the image features in the template smoother, this increases the combinations of similar templates. Accordingly, templates may be clustered and combined after lowering the resolution to further reduce the number of templates.

The template creation device may be further configured to perform a loop of the resolution modification unit performing the resolution modification process, the clustering unit performing the clustering process, and the integration unit performing the integration process on said new low resolution template set to create a new lower resolution template set to create a plurality of template sets with gradually decreasing resolution. If multiple layers of template sets are thusly prepared, template sets with lower resolution may be used for rough recognition, and the results of rough recognition may be used with template sets having high resolution for more detailed recognition. Consequently, this allows for highly accurate and fast object recognition processing.

The aforementioned template includes features for a plurality of feature points in an image of an object, and the aforementioned loop terminates when the number of feature points contained in a low-resolution template due to the resolution modification process is less than a predetermined value. This configuration addresses the issue where the performance of a template decreases when there are too few feature points within the template, which increases the likelihood that the object recognition accuracy will deteriorate.

The aforementioned template includes features for a plurality of feature points in an image of an object; a similarity score between two templates may be computed from the number of feature points where both the coordinate of the feature point and the feature value match between said two templates. This method provides a simple and fast way of computing the similarity score, and therefore reduces the time needed for creating a template.

The aforementioned template includes features for a plurality of feature points in an image of an object; and the integration unit may combine the features of the feature point at the same coordinate in each template in the group to create an integrated template. This method provides a simple and fast way of combining templates, and therefore reduces the time needed for creating a template.

Note that one or more embodiments may be implemented as a template creation device having at least a portion of the above-mentioned features or an object recognition device including a template creation device having at least a portion of the above-mentioned features. One or more embodiments may also be implemented as template creation method including at least a portion of the above-described processes; furthermore, an object recognition method may use this template creation method for creating templates; or, the template creation method may be implemented as a computer program for execution on a computer, or as a computer readable medium with the computer program permanently recorded thereon. The above-mentioned configurations and processes may be freely combined with each other insofar as is technically possible to configure one or more embodiments.

Effects

One or more embodiments can be expected to provide better results for reducing the number of templates and improved results when combining templates compared to existing techniques.

DETAILED DESCRIPTION

The disclosure relates generally to techniques for recognizing the 3D position or 3D pose of an object using template matching; the disclosure relates more specifically to techniques for creating a template for efficiently recognizing an object in three dimensions. These techniques may be applied to object recognition in, for example, image sensors used in factory automation, computer vision, machine vision, or the like. What follows is a description of one preferable application, namely an image sensor used in factory automation to identify the position and the pose of objects transported on a belt conveyor.

Overall Configuration of the Object Recognition Device

Figure 1:
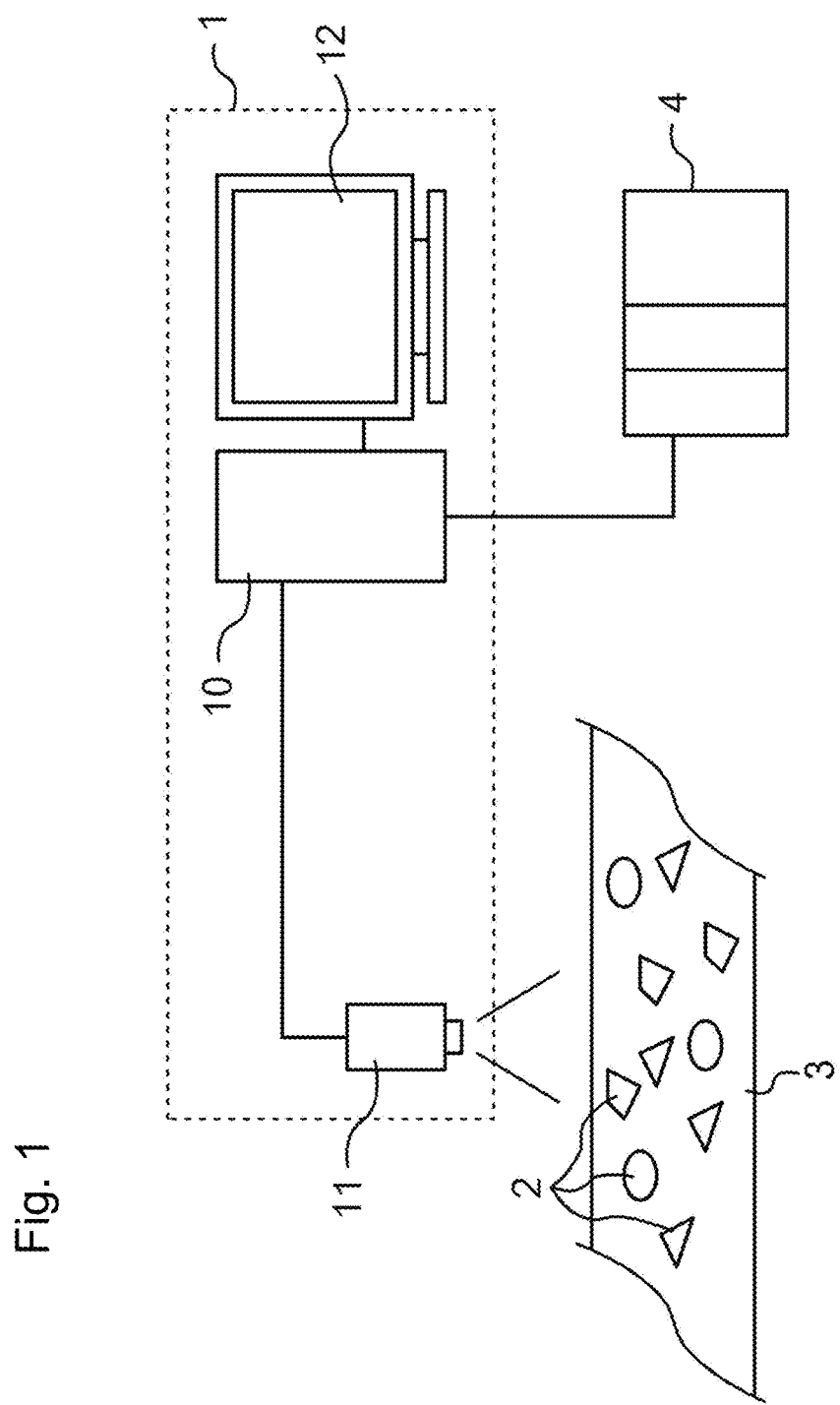
FIG. 1 a diagram illustrating an overall configuration of an object recognition device.

An overview of the configuration and a possible environment for an object recognition device according to one or more embodiments is described with reference to FIG. 1.

An object recognition device 1 may be installed on a production line or the like and may use images captured by the camera 11 to recognize an object 2 on the conveyor 3. Multiple objects 2 travel on the conveyor 3 in arbitrary poses. The object recognition device 1 receives images captured by the camera 11 at predetermined intervals, recognizes the type, position, or pose of each object 2 by way of an image processing device 10, and outputs the results thereof. The output (recognition result) from the object recognition device 1 may be used for picking, controlling a robot, controlling a machining or a printing device, inspection and measurement of an object 2, or the like.

Hardware Configuration

Figure 2:
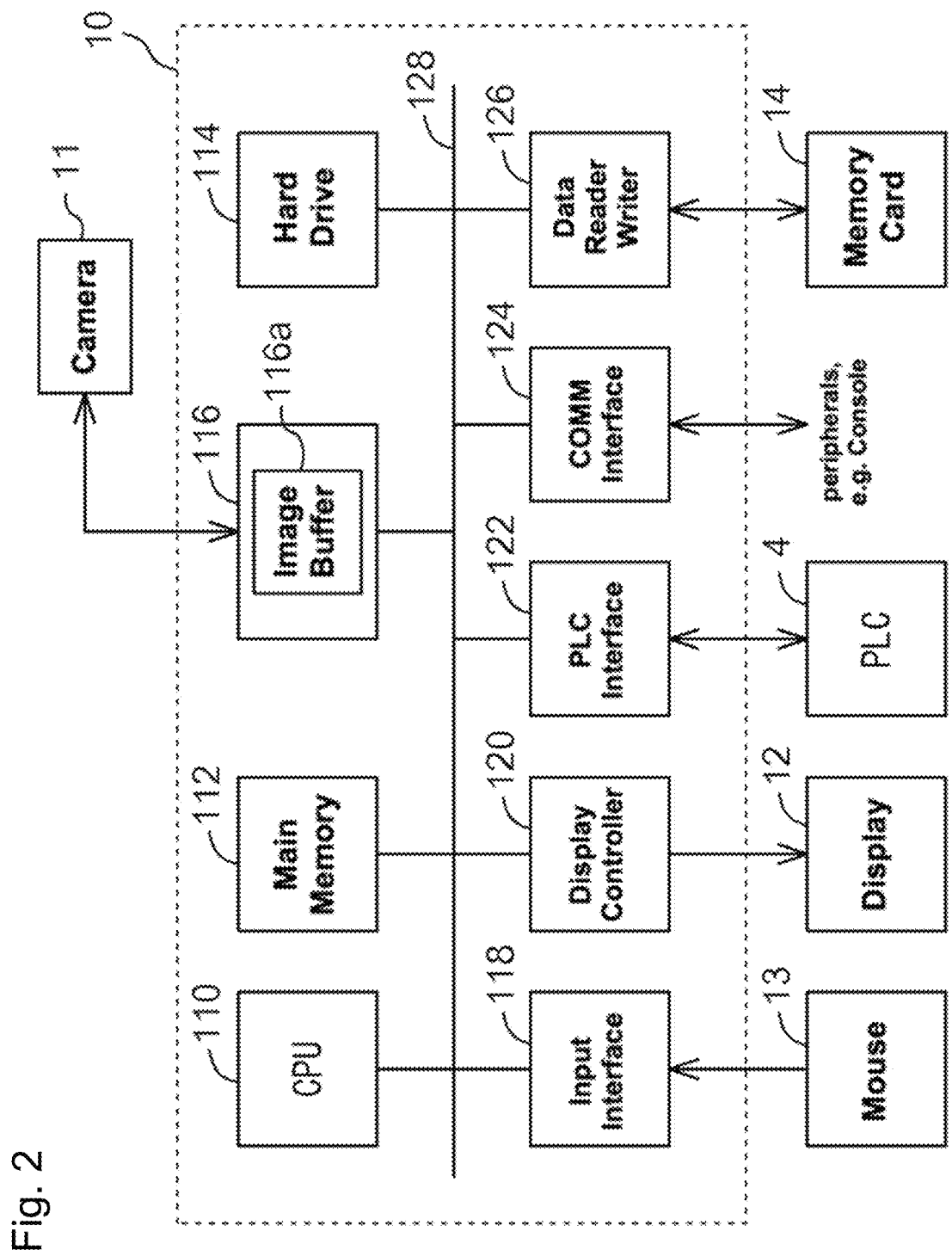
FIG. 2 a diagram illustrating a hardware configuration of an object recognition device.

A hardware configuration of the object recognition device 1 is described with reference to FIG. 2. The object recognition device 1 is generally configured from a camera 11 and an image processing device 10.

The camera 11 is an imaging device that acquires a digital image of the object 2 for the image processing device 10. For instance, a complementary metal-oxide-semiconductor (CMOS) camera or a charge-coupled device (CCD) camera can be suitably used for the camera 11. Any desired format (in terms of resolution, color or monochrome, still or video, gradient, and in terms of the data type, and the like) may be used for an input image. The format for the input image may be selected as appropriate according to the type of object 2 or the objective for sensing. The appropriate camera may be selected when special non-visible light images, such as x-ray or thermal images, or information such as depth (distance) and the like are to be used for object recognition or inspection.

The image processing device 10 includes a central processing unit 110 (CPU); a main memory 112, and a hard drive 114 as storage units; a camera interface 116; an input interface 118; a display controller 120; a PLC interface 122; a communication interface 124; and a data reader-writer 126. Each of these components is capable of data communication with each other via a bus 128.

The camera interface 116 mediates data transmission between the CPU 110 and the camera 11, and includes an image buffer 116a for temporarily storing image data from the camera 11. The input interface 118 mediates data transmission between the CPU 110 and an input device such as a mouse 13, a keyboard, a touchscreen panel, a jog controller, and the like. The display controller 120 is connected to a display 12 such as a monitor, and controls what is shown on the display 12. The PLC interface 122 mediates the data transmission between the CPU 110 and the PLC 4. The communication interface 124 mediates data transmission between the CPU 110 and a console (or a personal computer or a server device) or the like. The data reader-writer 126 mediates the data transmission between the CPU 110 and the memory card 14 which is a recording medium.

The image processing device 10 can be configured from a general purpose computer whereby the CPU 110 reads and executes a program stored on the hard drive 114 or the memory card 14 to provide the various desired functions. This kind of program is run while stored on a computer readable recording medium such as the memory card 14 or an optical disc, or may be provided (or downloaded) from the Internet. Note that a program according to one or more embodiments may be provided as a standalone application program, or may be provided as a module within another program. Finally, these functions may be replaced in whole or in part by a dedicated hardware circuit such as an application specific integrated circuit (ASIC).

Functional Configuration

Figure 3:
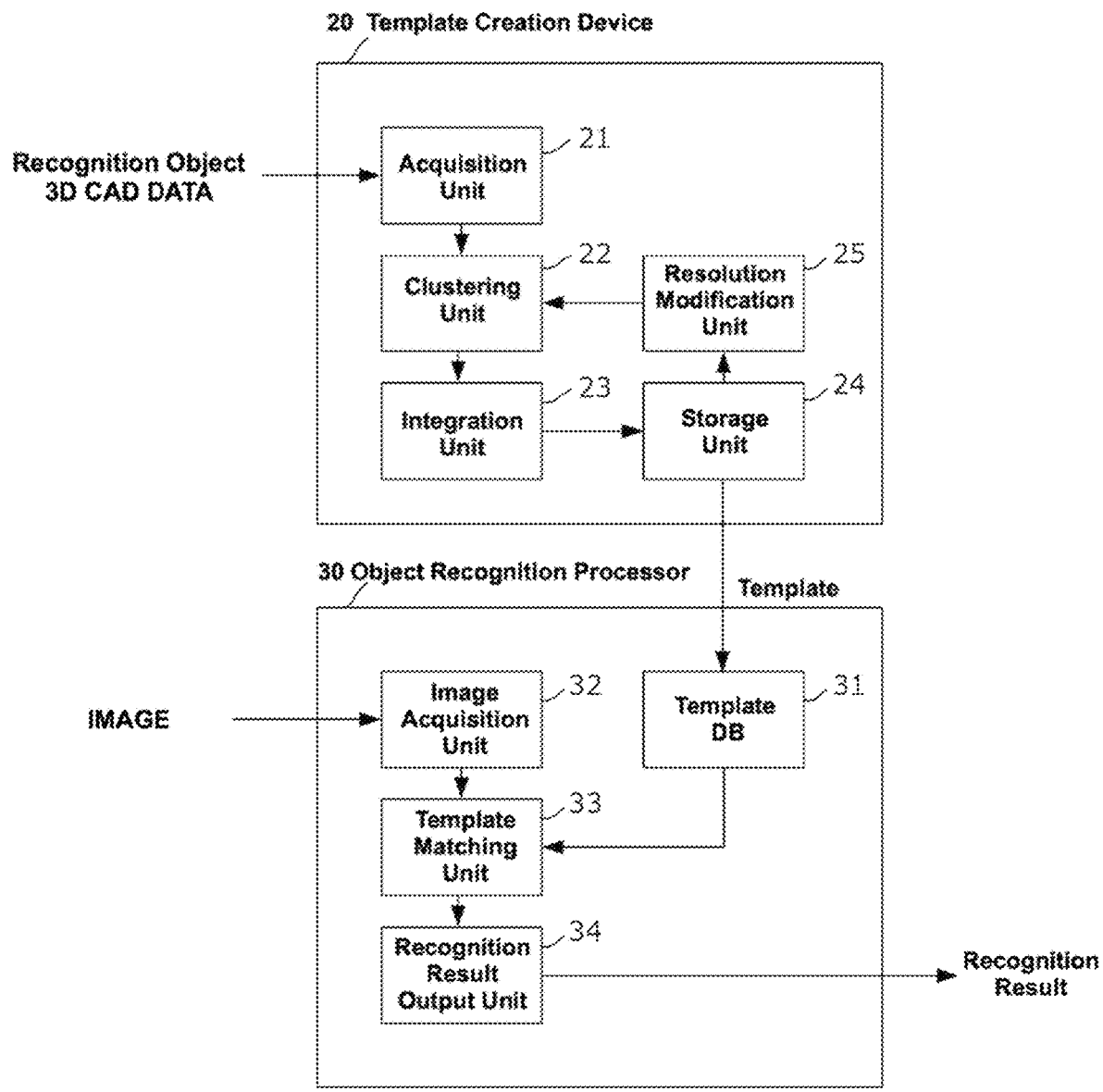
FIG. 3 a diagram illustrating functions in an object recognition device.

FIG. 3 illustrates functions in an object recognition device; the image processing device 10 may execute a program to realize the functions depicted in FIG. 3. The object recognition device 1 is provided in large part with a functional module serving as a template creation device 20 and a functional module serving as the object recognition processor 30. The template creation device 20 uses an object recognition process to create templates and is provided with an acquisition unit 21, a clustering unit 22, an integration unit 23, a storage unit 24, and a resolution modification unit 25. A template created by the template creation device 20 is registered with a template database (template DB 31) in the object recognition processor 30. The object recognition processor 30 matches templates with an image acquired from the camera 11 to recognize an object in the image. The object recognition processor 30 includes the template DB 31, an image acquisition unit 32, a template matching unit 33, and a recognition result output unit 34. These functions are described in detail later.

Figure 4:
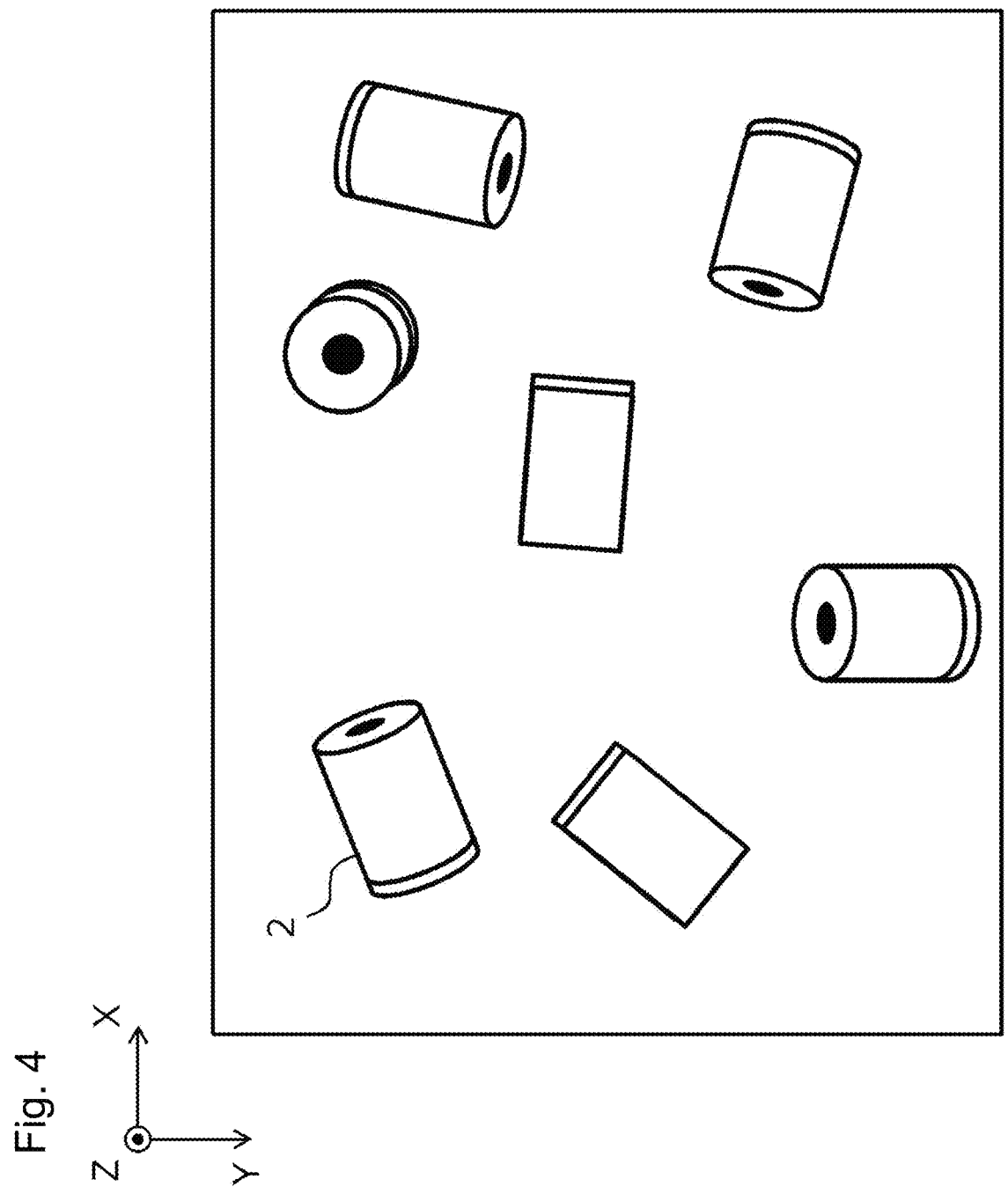
FIG. 4 a diagram illustrating one example of a mixture of objects in arbitrary poses.

FIG. 4 illustrates one example of an image acquired from the camera 11. As illustrated in FIG. 4, the image includes a plurality of objects 2 in various positions (XYZ coordinates) and poses (rotation angle about three axes, XYZ). Except for cases where the object is a perfect sphere, the shape of the image captured differs when the pose (orientation) of the object differs with respect to the camera 11. Accordingly, for ordinary template matching which uses a two-dimensional image to recognize a three-dimensional object in any pose, templates must be prepared for each possible positioning of the object, and templates compared round robin in order to find a match.

Figure 5:
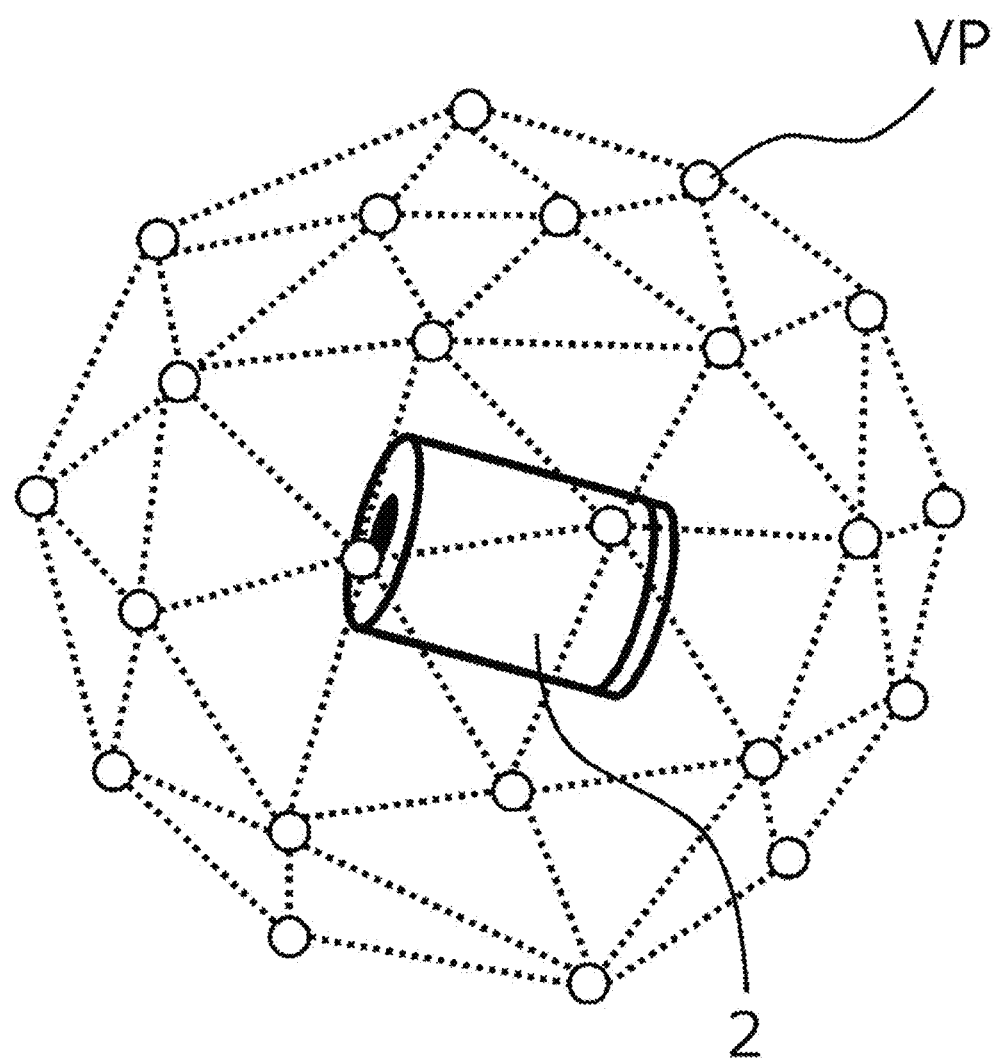
FIG. 5 is a schematic view illustrating one example of establishing a plurality of viewpoints for an object.

As illustrated in FIG. 5, this technique assumes preparing templates corresponding to an object's appearance (pose) from a plurality of viewpoints VP distributed evenly throughout a virtual semi-spherical plane about the object 2. For instance, when 337 individual viewpoints are set, 337 individual templates are needed for recognizing a single object 2. Moreover, considering the situation where the camera rotates while the viewpoint is fixed (the object rotates about the optical axis of the camera), then for instance, dividing 360° into 80 segments means that 337×80=26960 individual templates are needed. Assuming momentarily that processing one template requires 80 ms of processing time, it would take eight or more seconds to recognize a single three-dimensional object, which is impractical. Additionally, using more templates increases the processing time and requires more memory capacity. For instance, assuming that a template may be stored in 4 KB, then storing 26960 individual templates requires roughly 100 MB of memory. A greater memory capacity requirement increases the cost of the device and is thus undesirable.

Therefore, the object recognition device 1 according to one or more embodiments combines templates with similar image features in various ways to reduce the number of templates as much as possible. In factory automation in particular, the objects that need to be recognized (mechanical parts, manufactured products, and the like) are often designed by combining simple geometrical shapes, and often appear symmetrical. Consequently, the templates may often have a high degree of similarity even when the viewpoints are quite dissimilar, and thus a major reduction in the number of templates can be anticipated.

A process whereby the template creation device 20 creates templates is described, and thereafter a process whereby the object recognition processor 30 recognizes objects is described.

Template Creation Process

Figure 6:
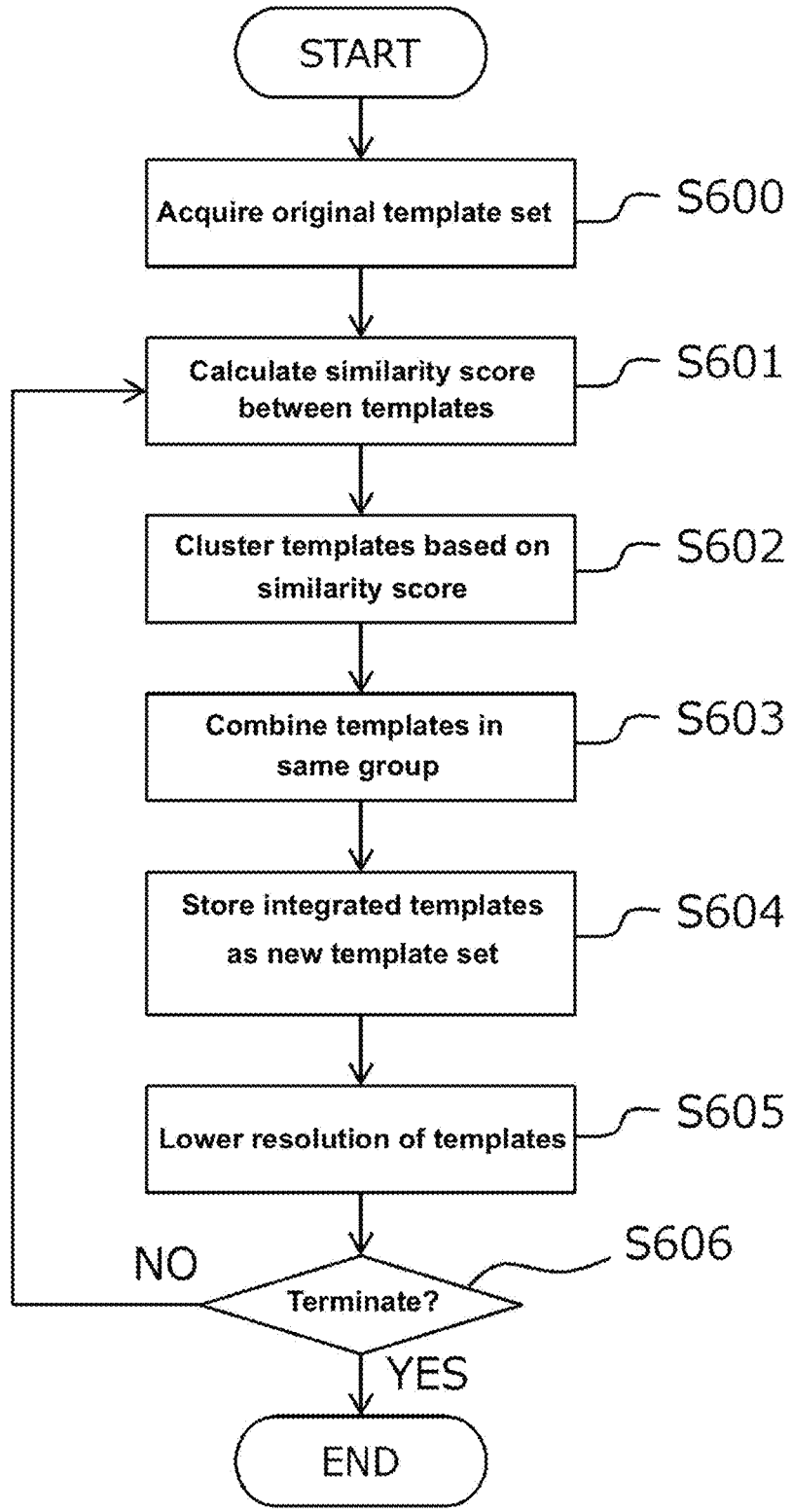
FIG. 6 is a flowchart illustrating the flow of processes for creating a template.

A process executed by the template creation device 20 to create templates is described in accordance with the flow depicted in FIG. 6. Note that in the specification, a template corresponding to a certain pose of a certain object (i.e., a template not combined with another template) is referred to as an original template. Further, a collection of a plurality of templates is referred to as a template set.

First, the acquisition unit 21 obtains an original template set for the object that is the recognition object (step S600). The original template set is made of original templates each of which corresponds to a plurality of poses that can be taken by the object (or a plurality of poses that need to be recognized). As previously described, recognizing 337 viewpoints segmented into 80 camera rotations would require 26960 templates to be acquired if a single template were created for a single viewpoint.

Figure 7:
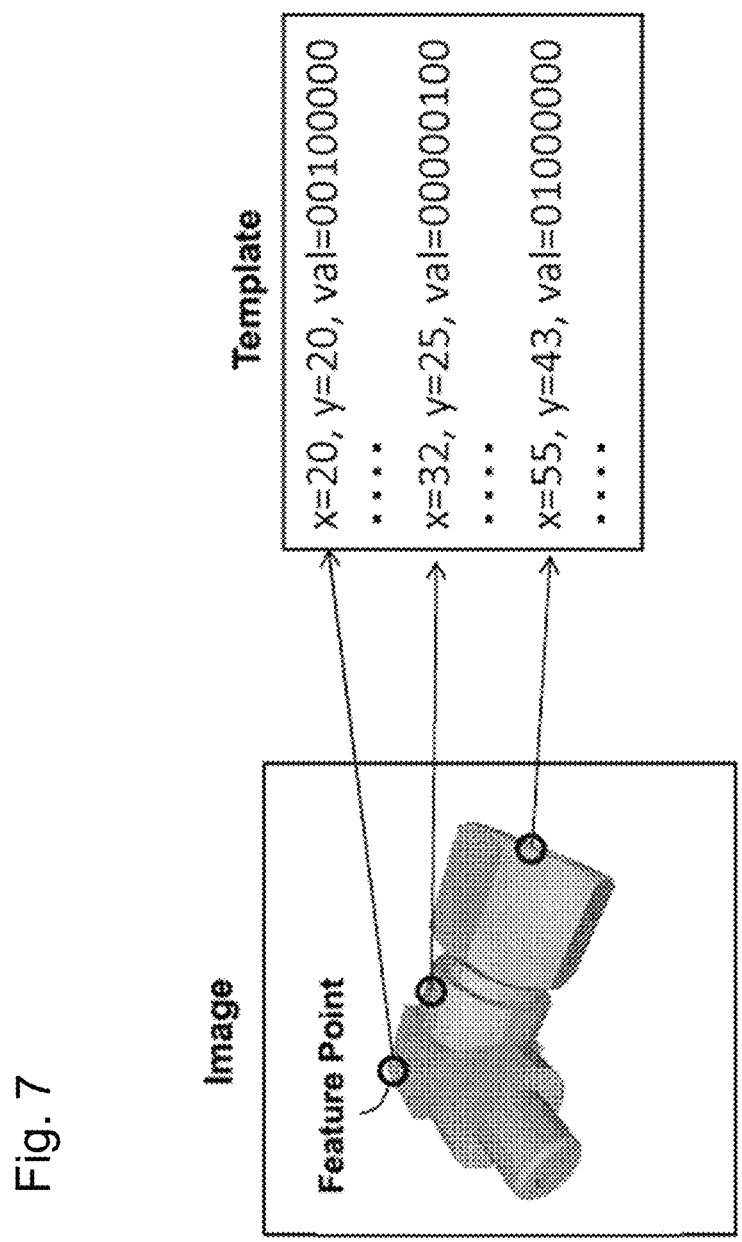
FIG. 7 a diagram illustrating an example data structure for a template.

A template represents certain characteristics of an object obtained from an image of the object. Any desired format may be used for the template, and in one or more embodiments the template data stores features for the plurality of feature points in the image as illustrated in FIG. 7. Each row in the template (right, FIG. 7) represents information for a single feature point, and the information for the feature point includes a coordinate (x, y) and a feature value (val) for the feature point; the origin of the coordinate system is at the center of the object.

For instance, a pixel value (brightness value), brightness gradient orientation, quantized gradient orientation, histogram of oriented gradients (HoG), HAAR-like features, Scale-Invariant Feature Transforms (SIFT), or the like may be used as a feature. The brightness gradient orientation represents the direction (angle) of the change in brightness in a local region centered on a feature point through continuous values. The quantized gradient orientation represents the direction (angle) of the change in brightness in a local region centered on the feature point as discrete values; for instance, the quantized gradient orientation maintains information for eight directions using one byte of values 0 to 7. The feature (val, FIG. 7) is an example of representing the quantized gradient orientation as base 2 values. Each bit represents directions 0°, 45°, 90°, 135°, 180°, 225°, 270°, 315°.

The system may acquire an image for each of the poses to detect feature points and extract feature values to thereby create an original template. Feature point detection and feature extraction can be carried out using known techniques, and therefore a detailed explanation of these processes is omitted. An image of each of the poses may be obtained by actually capturing an image of the object. Alternatively, in cases where three-dimensional CAD data of the object is available, then the data may be rendered into a 3D computer graphic whereby an image can be taken of the desired pose (viewpoint, rotation angle) and lighting. In one or more embodiments the acquisition unit 21 accepts 3D CAD data representing the recognition object and the system uses images of each viewpoint generated from the CAD data to automatically create an original template set.

Next, the clustering unit 22 calculates an inter-template similarity score (step S601). At this point, the similarity score for every combination of two templates selected from the template set is calculated; e.g., 26960 total number of templates, that is (26960×26959)/2=363407320 combinations). A similarity score is a measure representing the degree of match between the image features representing one template and the image features representing another template. One or more embodiments count the number of feature points where the coordinates (x, y) and the feature (val) match between the two templates, and the number of matching feature points (or, the number of matching feature points divided by the total number of feature points in the template) taken as the similarity score.

The clustering unit 22 divides the plurality of templates in the template set into a plurality of groups (clusters) in a clustering process based on the similarity score calculated in step S601 (step S602). Hereby, mutually similar templates are collected into the same group. Any desired algorithm may be used for clustering, e.g., k-means, x-means, spectral clustering or the like.

Next, the integration unit 23 combines all the templates within a group into a single integrated template for each group obtained in step S602 (step S603). In one or more embodiments, an integrated template is generated by combining the features (val) of feature points at the same coordinate (x, y) in each template within a group. Any desired method may be used for combining features. For instance, when the features represent a single value such as the brightness, a mean, mode, total, maximum, minimum or the like may be used as the feature after combining the templates. A combination of histograms may also be used for an integrated feature when the feature is a value in a HoG. In one or more embodiments, combining templates involves generating a single integrated template from all the templates in a group; however, the process may be configured to generate n templates, where n is a number greater than 1 and is less than the total number of templates within a group. For example, when the integrated feature is a mean value, other integrated templates may be generated by for instance creating an integrated template where the integrated feature amount is the mode value.

Figure 8:
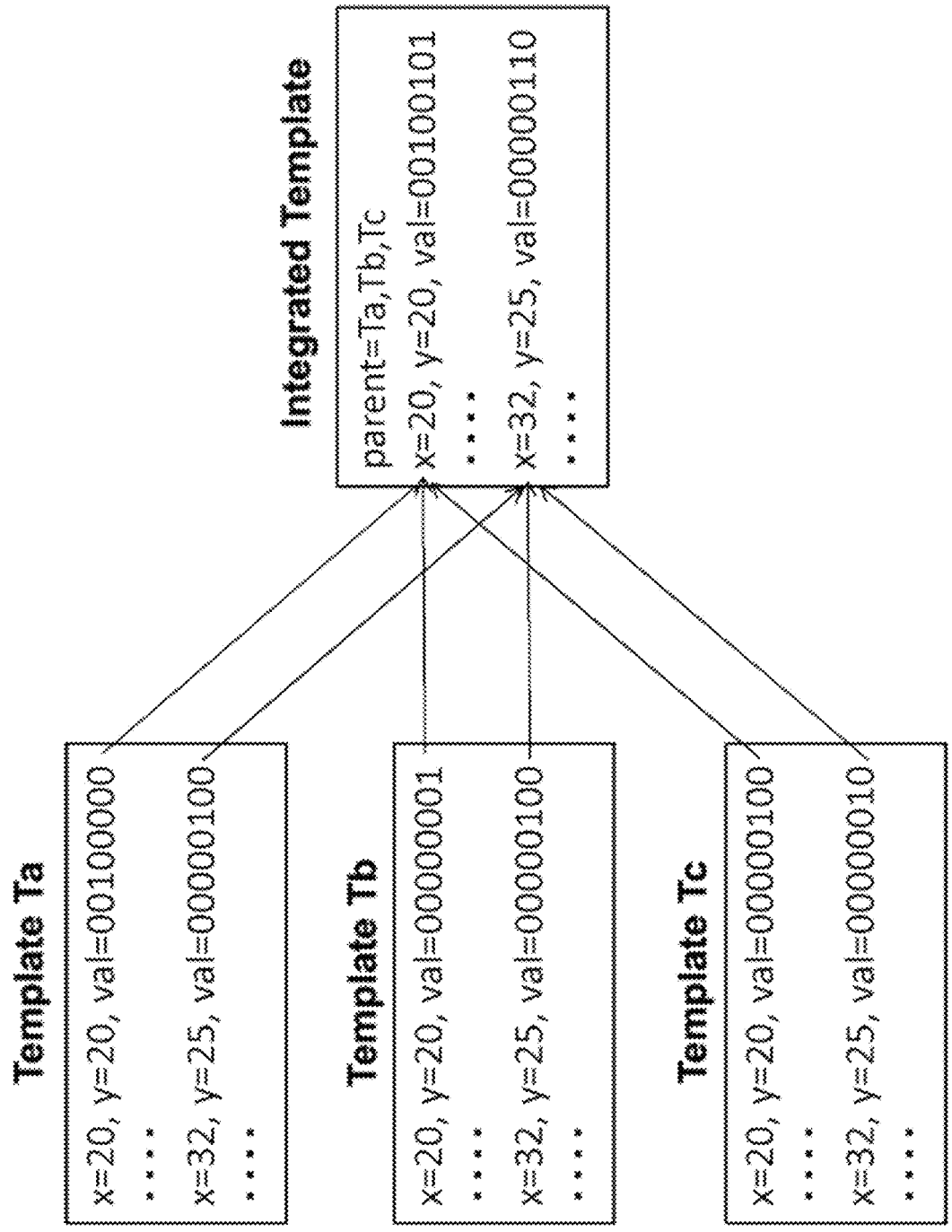
FIG. 8 a diagram illustrating an example of combining templates.

FIG. 8 illustrates one example of combining features (quantized gradients) in three templates Ta, Tb, Tc. A feature point at (20, 20) is an integrated feature value "00100101" obtained by combining the corresponding feature in templates Ta-Tc, namely feature values: "00100000", "00000001", and "00000100". Similarly, when combined, the feature at (32, 25) is an integrated feature value "00000110" which is obtained by combining the feature values "00000100", "00000100", "00000010". The integrated template also stores information, "parent" which is used for referencing the templates Ta-Tc. The reference information "parent" may be referenced to identify new templates Ta-Tc used to create the aforementioned integrated template.

The combination process in step S603 is run on each of the groups to obtain a plurality of integrated templates. The plurality of integrated templates is stored in the storage unit 24 as new template sets (step S604). The template set is used during the object recognition process in determining to which of the plurality of groups the recognition object 2 belongs.

In contrast, the resolution modification unit 25 lowers the resolution of each integrated template among the plurality of integrated templates obtained in step S603 to create a plurality of low-resolution templates (step S605). The process of lowering the resolution of a template involves combining a plurality of neighboring feature points on the basis of the positional relationship of the feature points. Because lowering the resolution of the template makes the image features in the template smoother, this increase is the combinations of similar templates. Accordingly, templates may be clustered and combined after lowering the resolution to further reduce the number of templates.

Figure 9:
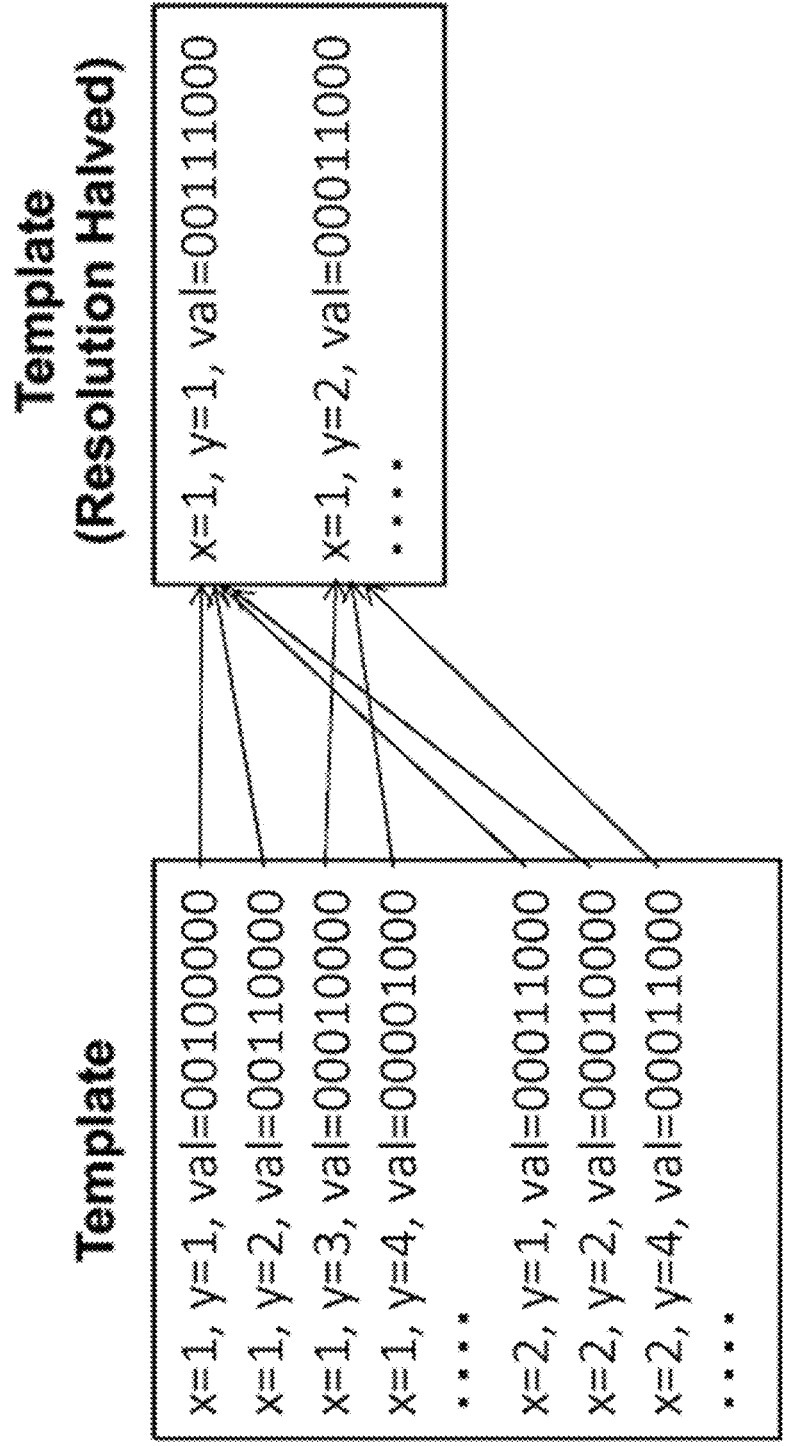
FIG. 9 a diagram illustrating an example of lower the resolution of templates.

FIG. 9 illustrates an example of halving the resolution of a template. To halve the resolution of a template, neighboring feature points within a 2×2 area are combined into a single feature point. In the example illustrated in FIG. 9, the result of combining the feature values at four feature points at (1, 1), (1, 2), (2,1), and (2,2) provide a feature value for the feature point at (1, 1) in the low resolution template. The result of combining the feature values for three feature points at (1,3), (1,4), and (2,4) provide a feature value for the feature point at (1, 2) in the low-resolution template. Note that this is merely one example of the process and other methods may be used for lowering the resolution of a template.

The resolution modification unit 25 verifies whether or not the number of feature points included in each low resolution template is greater than or equal to a predetermined value in step S606. If any of the low-resolution templates include a feature point that is greater than or equal to the predetermined value (NO, step S606) the process returns to step S601. The plurality of low-resolution templates is obtained in step S605 are similarly clustered (step S602) and combined (step S603) to create new low-resolution template sets which are stored in the storage unit 24 (step S604).

The above-described process is repeated to create the plurality of template sets whose resolution gradually decreases. The process exits the loop and terminates creation of templates when the number of feature points in any of the templates after reducing the resolution is less than the predetermined value (YES, step S606). The number of feature points within a template is established as a condition for terminating the process because the performance of the templates decreases when there are too few feature points, which increases the likelihood that the object recognition process will be less accurate.

Figure 10:
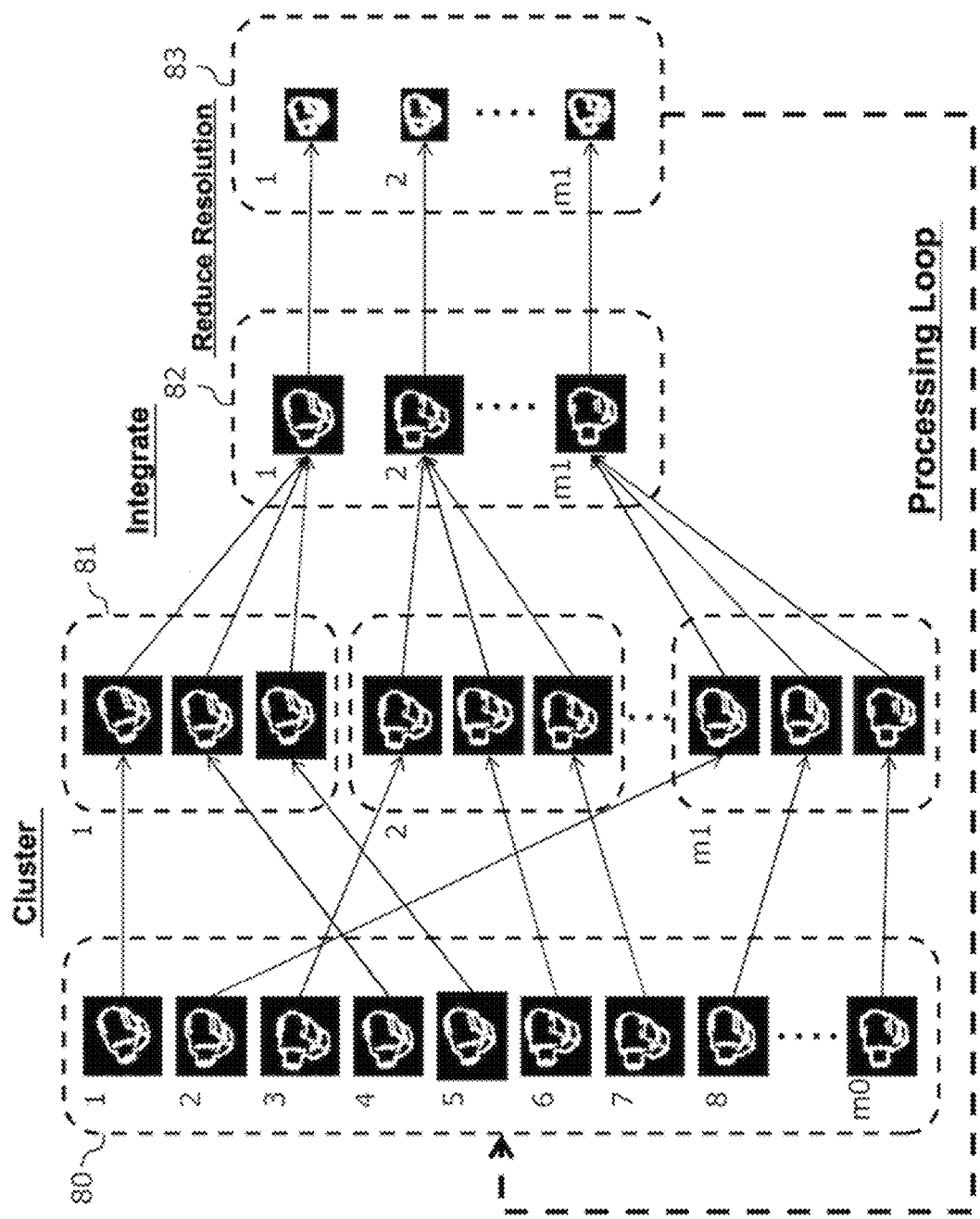
FIG. 10 a diagram illustrating an overview of the flow for clustering, integrating, and lowering the resolution of templates.

FIG. 10 provides an overview of the flow for clustering (step S602), integrating (step S603), and lowering the resolution (step S605) of the templates. For the sake of simplicity an image is used to represent a template in FIG. 10, where black pixels indicate coordinates with no feature point and white pixels indicate coordinates with a feature point. The left side of FIG. 10 depicts a template set 80 made up of m0 templates. The template set 80 is clustered on the basis of the degree of similarity between templates whereby m1 groups 81 (clusters) are obtained (m0>m1). Templates are combined for each group; hereby, a new template set 82 is created made up of m1 integrated templates. Lowering the resolution of the templates thereafter creates m1 low-resolution templates 83 which are again clustered and combined.

Figure 11:
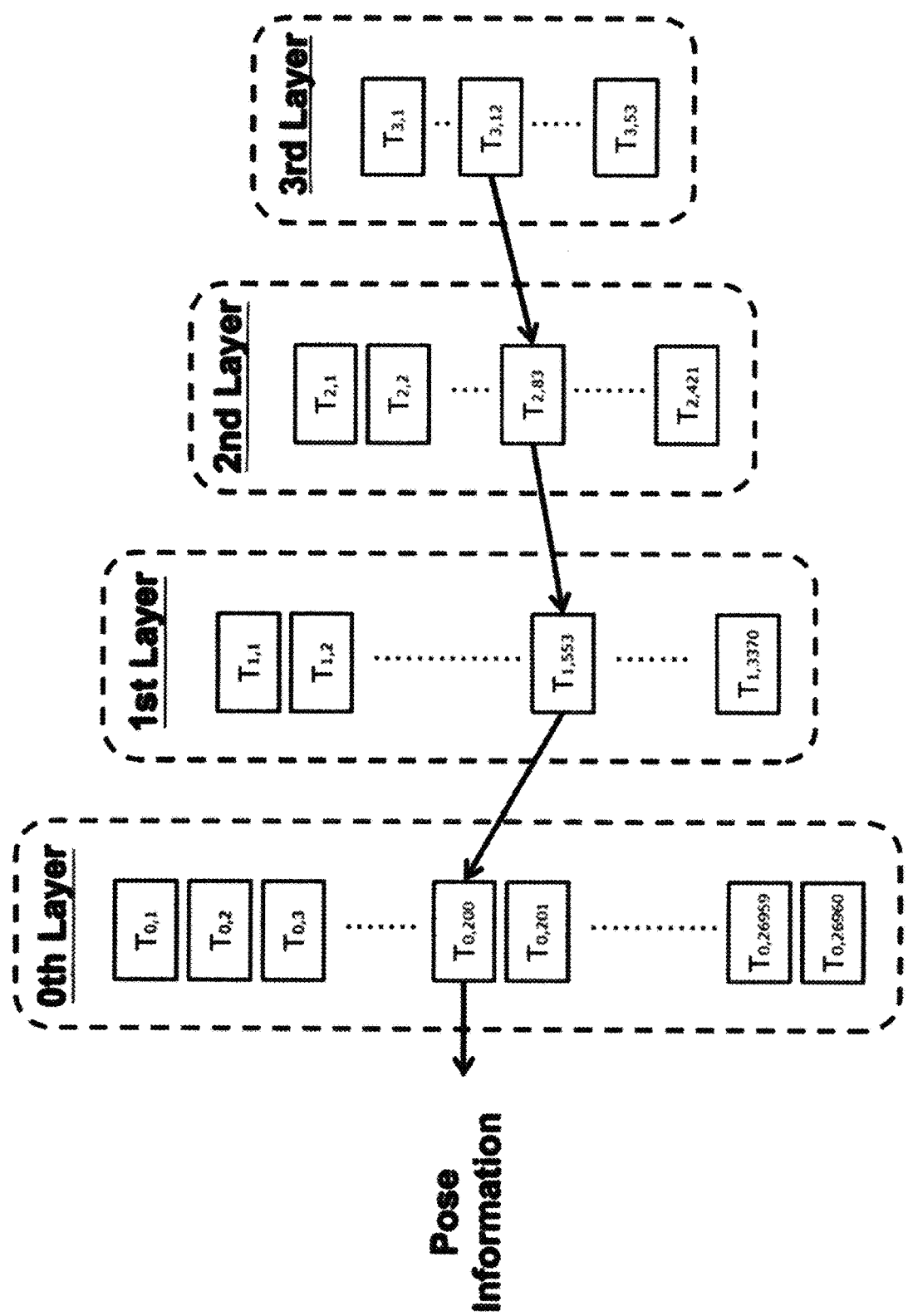
FIG. 11 is a schematic view illustrating one example of a layered template set.

FIG. 11 is a schematic view of one example of a layered template set obtained through looped processing. For instance, original templates may be clustered and combined three times to create groups (clusters) containing one-eighth the original number of elements; in this case, the original (0th) layer contains 26960 templates T0, which are reduced to 2270 templates T1 in the first layer, 421 templates T2 in the second layer, and 53 templates T3 in the third layer. These template sets are stored in the template DB 31 and used in the object recognition processor 30 to recognize objects.

Object Recognition Process

Figure 12:
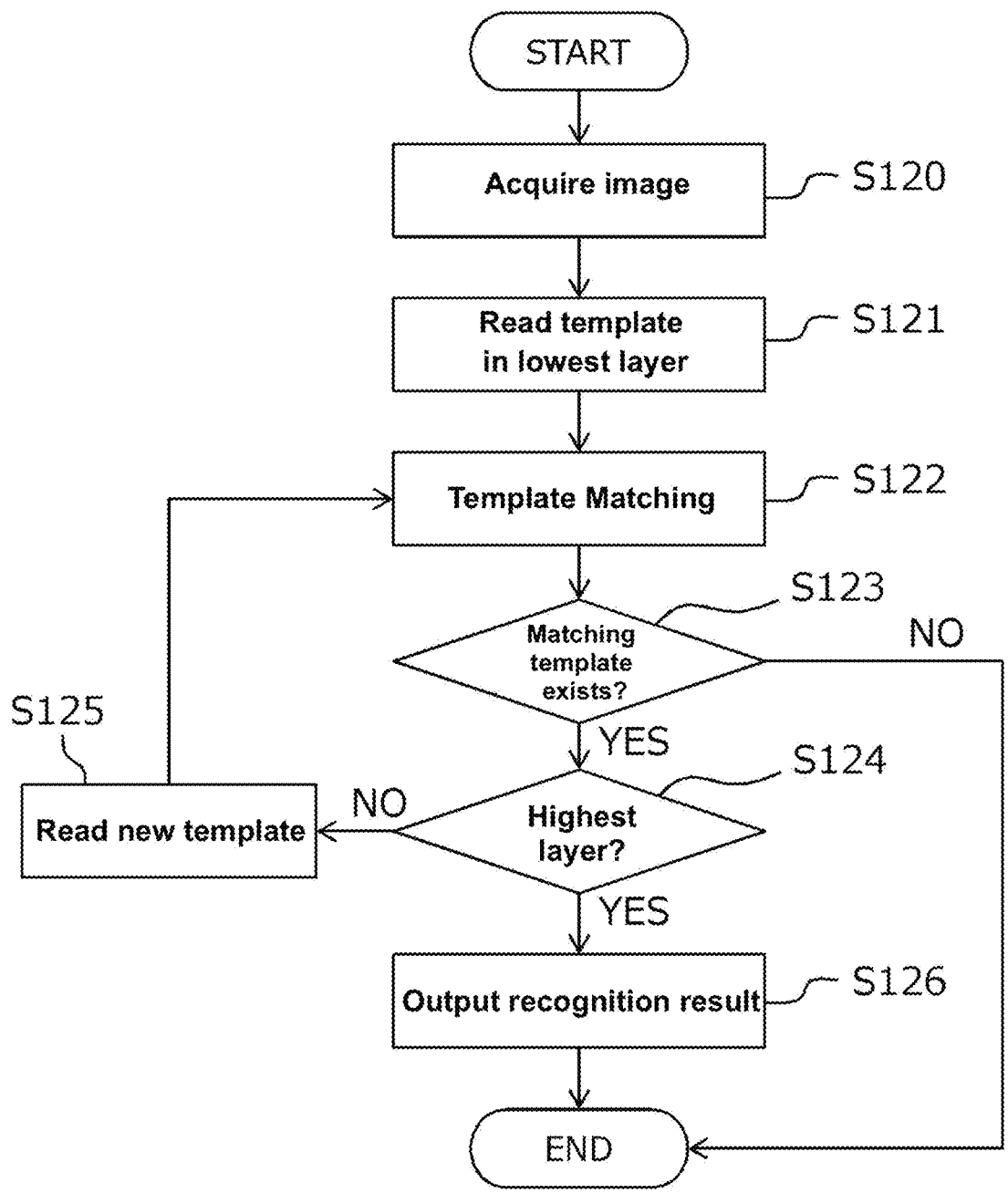
FIG. 12 is a flowchart illustrating the flow of processes for recognizing an object.

Next, the object recognition process run by the object recognition processor 30 is described in accordance with the flow depicted in FIG. 12.

First the image acquisition unit 32 obtains an image from the camera 11 (step S120). This image captures the object 2 in an arbitrary pose.

The template matching unit 33 reads a template set from the lowest layer in the template DB 31 (step S121) and uses these template sets for template matching (step S122). When any of the templates produces a match (YES, step S123), the template matching unit 33 reads the parent template of the matching template from an upper layer (step S125). The template matching unit 33 uses the newly acquired template set for template matching (step S122) to further reduce the number of templates. The above operations repeat until the template matching unit arrives at a template in the uppermost layer (step S124), whereby the template in the uppermost layer that best matches the image is finally identified. In the example illustrated in FIG. 11, templates are selected in order from template T3,12 in the third layer, to template T2,83 in the second layer, to template T1,533 in the first layer, to template T0,200 in the zeroth layer. The template T0, 200 in the zeroth layer is identified as the pose of the object 2 since the template corresponds one to one with the pose of the object 2.

The recognition result output unit 34 outputs pose information for the object 2 as a recognition result (step S126). The recognition result may be used for picking, controlling a robot, controlling a machining or a printing device, inspection and measurement of an object 2, or the like.

Advantages of Embodiment

The template creation method in one or more embodiments above described combines templates with similar image features (regardless of the distance of the viewpoint); therefore, more suitable combination of templates and better results can be expected when reducing the number of templates compared to conventional approaches which reduce the number of viewpoints. The effects are greatly improved particularly when the recognition object is symmetrical or simply shaped.

One or more embodiments also create multiple layers of template sets and perform a multi-layered search; more specifically, one or more embodiments use template sets with lower resolution for rough recognition, and use the results of rough recognition with template sets having high resolution for more detailed recognition. Consequently, one or more embodiments are able to achieve highly accurate and fast object recognition processing. For instance, in the example illustrated in FIG. 11 without a multilayer search, the recognition process would require round robin matching against 26960 original templates. In contrast, even when the multilayer search requires 53 templates for matching in the third layer, and eight templates for matching in each of the second, first, and zeroth layers, matching is performed a total of 77 times and is thus results in a lighter processing load.

Modification Examples

The above described embodiments are merely one or more specific examples of the invention. The scope of the invention is not limited to this specific example. The invention may adopt various specific configurations insofar as the configurations do not depart from the technical concepts of the invention.

For instance, the original template set in the above embodiment is made up of templates obtained from each image in a plurality of images taken of different poses of a single object; however, the template set may be a plurality of images captured for plurality of (different) objects. Given that even different objects have a similar appearance, a common template may be adopted so long as the image features are similar. A multi-layered template set may also be created in this case from the same procedures described for the above embodiments. This kind of template set may be preferably adopted to recognize both the type and pose of an object, for instance, on a production line where a plurality of different kinds of objects are mixed on a conveyor.

In the above embodiments different templates were prepared in accordance with the rotation of the camera despite having the same viewpoint; however, a single viewpoint may have only a single template created therefor, and the image or template rotated during the template matching process. Hereby, the number of templates may be further reduced.

The above-mentioned embodiments provides an example of an image using brightness as the pixel value, however, an image using the distance from the corresponding pixel to the object as the pixel value (distance image) may also be adopted. In this case, it is possible to directly determine the shape of the object from the distance image; however the distance image and the template obtained from 3D CAD data may be matched to allow the system to more accurately recognize the 3D position or 3D pose of the object.

REFERENCE NUMERALS

1 Object recognition device
2 Object
3 Conveyor
10 Image processing device
11 Camera
20 Template creation device
21 Acquisition unit
22 Clustering unit
23 Integration unit
24 Storage unit
25 Resolution modification unit
30 Object recognition processor
31 Template DB
32 Image acquisition unit
33 Template matching unit
34 Recognition result output unit

The invention claimed is:

1. A template creation device configured to create templates used in an object recognition device configured to recognize objects using template matching, the template creation device comprising a processor configured with a program to perform operations comprising:
    operation as an acquisition unit configured to acquire a plurality of templates from a plurality of images, each of the plurality of images corresponding to: different poses of a single object of a plurality of objects; or different ones of the plurality of objects;
    operation as a clustering unit configured to perform a clustering process comprising:
        computing, for each combination of two templates selected from the plurality of templates, a similarity score based on a degree of match between image features of the selected two templates; and
        dividing the plurality of templates into a plurality of groups based on the respective similarity scores corresponding to the combinations of two templates; and
    operation as an integration unit configured to perform an integration process comprising creating a plurality of integrated templates by, for each of the plurality of groups, combining all the templates in the group into: a single integrated template or; a number of integrated templates, the number of integrated templates being fewer than a number of templates within the group.

2. The template creation device according to claim 1, wherein:
    the processor is configured with the program to perform operations further comprising operation as a resolution modification unit configured to perform a resolution modification process comprising creating a plurality of low-resolution templates corresponding to the plurality of integrated templates by combining feature points of each of the plurality of integrated templates to reduce a number of feature points; and
    the processor is configured with the program such that:
        operation as the clustering unit comprises operation as the clustering unit that performs the clustering process on the plurality of low-resolution templates; and
        operation as the integration unit comprises operation as the integration unit that performs the integration process on the plurality of low-resolution templates to create a new low-resolution template set.

3. The template creation device according to claim 2, wherein the processor is configured with the program to perform operations further comprising performing a processing loop comprising the resolution modification unit performing the resolution modification process, the clustering unit performing the clustering process, and the integration unit performing the integration process on the new low-resolution template set to create a new lower-resolution template set and to create a plurality of template sets with gradually decreasing resolution.

4. The template creation device according to claim 3, wherein a template from the plurality of templates comprises features for a plurality of feature points in an image of an object from the plurality of objects; and
    the processor is configured with the program such that the processing loop terminates in response to the number of feature points contained in the template due to the resolution modification process being less than a predetermined value.

5. The template creation device according to claim 4, wherein the processor is configured with the program such that: operation as the clustering unit comprises operation as the clustering unit that computes the similarity score between two templates from the plurality of templates based on a number of feature points in which both a coordinate of the feature point and a feature value match between the two templates.

6. The template creation device according to claim 2, wherein the processor is configured with the program such that:
    a template from the plurality of templates comprises features for a plurality of feature points in an image of an object from the plurality of objects; and
    operation as the integration unit comprises operation as the integration unit that combines the features of the feature point at a same coordinate in each template in the group to create an integrated template.

7. The template creation device according to claim 3, wherein the processor is configured with the program such that:
    a template from the plurality of templates comprises features for a plurality of feature points in an image of an object from the plurality of objects; and
    operation as the clustering unit comprises operation as the clustering unit that computes the similarity score between two templates from the plurality of templates based on a number of feature points in which both a coordinate of the feature point and a feature value match between the two templates.

8. The template creation device according to claim 3, wherein the processor is configured with the program such that:
    a template from the plurality of templates comprises features for a plurality of feature points in an image of an object from the plurality of objects; and
    operation as the integration unit comprises operation as the integration unit that combines the features of the feature point at a same coordinate in each template in the group to create an integrated template.

9. The template creation device according to claim 2, wherein the processor is configured with the program such that:
    a template from the plurality of templates comprises features for a plurality of feature points in an image of an object from the plurality of objects; and
    operation as the clustering unit comprises operation as the clustering unit that computes the similarity score between two templates from the plurality of templates based on a number of feature points in which both a coordinate of the feature point and a feature value match between the two templates.

10. The template creation device according to claim 4, wherein the processor is configured with the program such that:
    operation as the integration unit comprises operation as the integration unit that combines the features of the feature point at a same coordinate in each template in the group to create an integrated template.

11. The template creation device according to claim 1, wherein the processor is configured with the program such that:
    a template from the plurality of templates comprises features for a plurality of feature points in an image of the object; and
    the similarity score between the two templates in the respective combination is computed based on a number of feature points in which both a coordinate of the feature point and a feature value match between the two templates.

12. The template creation device according to claim 11, wherein the processor is configured with the program such that:
   a template from the plurality of templates comprises features for a plurality of feature points in an image of an object from the plurality of objects; and
   operation as the integration unit comprises operation as the integration unit that combines the features of the feature point at a same coordinate in each template in the group to create an integrated template.

13. The template creation device according to claim 1, wherein the processor is configured with the program such that:
   a template from the plurality of templates comprises features for a plurality of feature points in an image of the object; and
   operation as the integration unit comprises operation as the integration unit that combines the features of the feature point at a same coordinate in each template in the group to create an integrated template.

14. A template creation method of creating templates used in an object recognition device configured to recognize objects using template matching, the template creation method comprising:
   acquiring a plurality of templates from a plurality of images, each of the plurality of images corresponding to: different poses of a single object of a plurality of objects; or different ones of the plurality of objects;
   performing a clustering process comprising:
      computing, for each combination of two templates selected from the plurality of templates, a similarity score based on a degree of match between image features of the selected two templates; and
      dividing the plurality of templates into a plurality of groups based on the respective similarity scores corresponding to the combinations of two templates;
   performing an integration process comprising creating a plurality of integrated templates by, for each of the plurality of groups, combining all the templates in the group into: a single integrated template; or a number of integrated templates, the number of integrated templates being fewer than a number of templates within the group; and
   storing the plurality of integrated templates as a template set used for determining, for each of the plurality of objects, which of the plurality of groups the object belongs.

15. A non-transitory computer-readable recording medium storing a program for causing a computer to perform operations comprising the template creation method according to claim 14.

16. The template creation method according to claim 14, further comprising:
   performing a resolution modification process comprising creating a plurality of low-resolution templates corresponding to the plurality of integrated templates by combining feature points of each of the plurality of integrated templates;
   performing the clustering process on the plurality of low-resolution templates; and
   performing the integration process on the plurality of low-resolution templates to create a new low-resolution template set.

17. The template creation method according to claim 16, further comprising performing a processing loop comprising performing the resolution modification process, the clustering process, and the integration process on the new low-resolution template set to create a new lower-resolution template set and to create a plurality of template sets with gradually decreasing resolution.

18. The template creation method according to claim 17, wherein a template from the plurality of templates comprises features for a plurality of feature points in an image of an object from the plurality of objects, the method further comprising terminating the processing loop in response to a number of feature points contained in the template due to the resolution modification process being less than a predetermined value.

19. The template creation method according to claim 14, wherein a template from the plurality of templates comprises features for a plurality of feature points in an image of an object from the plurality of objects, the method further comprising computing the similarity score between two templates from the plurality of templates based on a number of feature points in which both a coordinate of the feature point and a feature value match between the two templates.

20. The template creation method according to claim 14, wherein a template from the plurality of templates comprises features for a plurality of feature points in an image of an object from the plurality of objects, the method further comprising combining the features of the feature point at a same coordinate in each template in the group to create an integrated template.

* * * * *